Aug. 3, 1965 R. D. ALLEMAN 3,197,900

ANIMATION DEVICE

Original Filed Feb. 5, 1962

INVENTOR.
RONALD D. ALLEMAN
BY George F. Westerman
ATTORNEY 3,197,900
Patented Aug. 3, 1965

3,197,900

ANIMATION DEVICE

Ronald D. Alleman, 561st Eng. Co. (Port Construction), Fort Baker, Calif.

Original application Feb. 5, 1962, Ser. No. 171,321, now Patent No. 3,144,726, dated Aug. 18, 1964. Divided and this application June 9, 1964, Ser. No. 382,677
2 Claims. (Cl. 40—78)
(Granted under Title 35, U.S. Code (1952), sec. 266)

This is a division of applicant's co-pending application Serial No. 171,321, filed February 5, 1962, now Patent No. 3,144,726, issued August 18, 1964.

The invention described herein may be manufactured and used by or for the Government for governmental purposes without the payment of any royalty thereon.

The present invention relates to a mechanism for producing an illusion of motion from a succession or series of picture-bearing cards, film or the like, by manipulation thereof in such a manner that successive cards or film of a series thereof may be removed from one portion of a stack or supply thereof and deposited at another position within such stack or supply in a manner so that, after viewing, each card will come to assume its original serial position as the stack or supply thereof becomes exhausted by such manipulative operations. These operations can be carried out at such speed that there appears to the eye of a viewer an illusion of continuous or uninterrupted motion between the pictures or images on successive cards or at a slower speed enabling reading or close viewing of individual cards. Viewing of the individual cards successively is accomplished as each is held stationary momentarily at one point in the above cycle.

Accordingly, an object of the present invention is to provide a mechanism of the above-indicated character which is useful as a training aid in connection with military training, but which is also adaptable to a wide diversity of applications.

A second object of this invention is to provide for an inexpensive viewer of opaque film frames, which is manually operated, and compact and simple in construction and operation, which is readily adapted to motor driven operation and a multitude of uses involving the manipulation of various types of intelligence bearing or intelligence receptive sheets.

Figure 2:
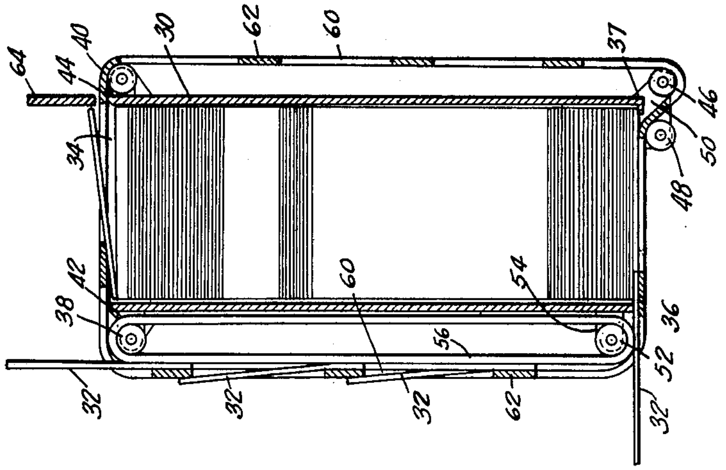
Figure 1:
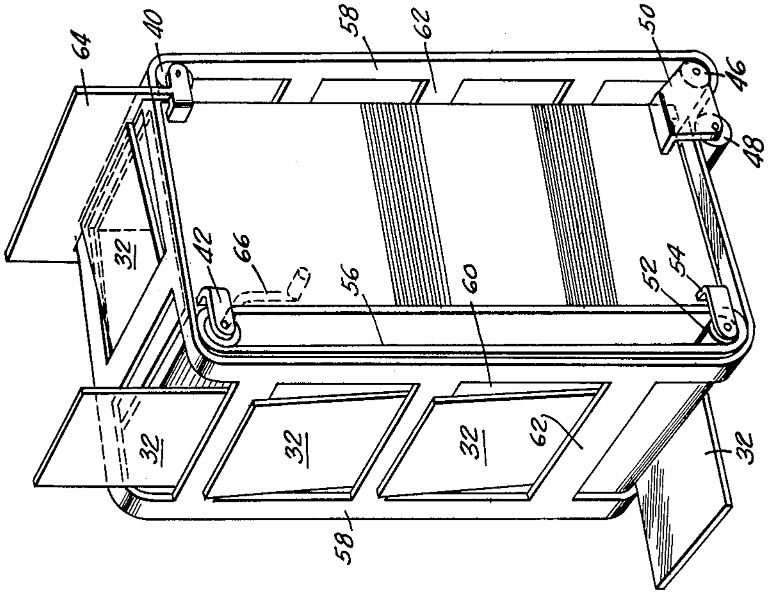

The structural features of an embodiment of the invention are illustrated in the accompanying drawings, in which:

FIG. 1 is a perspective view showing one embodiment of an animation device constructed in accordance with the present invention; and FIG. 2 is a central vertical sectional view of the structure of FIG. 1.

It will be understood that the term "cards" as used throughout the present description is intended to include in addition to flexible opaque image bearing cards, transparent and translucent image bearing photographic film which is to be manipulated in like manner to opaque cards in the construction illustrated in the accompanying drawings.

Referring to the drawings, reference numeral 30 designates a holder or magazine holding a sequence of image or indicia bear-cards 32 which are to be viewed in animated sequence, the cards 32 being hold in stacked magazine 30 in horizontal position, the magazine 30 having an open upper end 34 and an open lower or bottom end 36. The magazine 30 has an interior cross-section slightly greater than the cards 32 stacked therein so that the cards may lie flatly in the magazine and in a substantially even pile. The cards 32 are retained in the magazine 30 by a short inwardly turned flange 37 on the bottom end of the magazine.

As will be seen from FIGS. 1 and 2, the structure is provided with top rollers 38 and 40, mounted in bearing brackets 42 and 44 on diametrically opposite sides of the magazine 30. There is also a pair of bottom rollers 46 and 48, which are mounted in a common bearing bracket 50, and a third bottom roller 52 mounted in a bearing bracket 54 and positioned in vertical alignment with the top roller 38. The bottom roller 46 is also in alignment with the top roller 40. An inner endless flexible belt 56 passes around top roller 38 and bottom roller 52 closely adjacent to which inner endless belt 56 is an outer flexible belt 58 which passes around all of the rollers, both top and bottom, and which is provided with equal openings 60, defined between equal transverse webs 62, which comprise the card pickup means. Each of the webs 62 operates to slide in successive sequence, a card from the bottom of the stacked cards 32, and clamp each removed card against the inner endless belt 56. Each of the cards is conveyed up the side of and across the top of magazine 30 to stop 64, which stops the movement of the successive cards and deposits each thereof on top of the stack or pile of cards 32, in reversed position with respect to the image thereon, each card that is so replaced on the top of the stack taking the place of a card which has been removed from the bottom of the stack. When roller 38, operated by crank 66, is rotated, belts 56 and 58 are caused to move and to sequentially remove cards 32 from the bottom of magazine 30. Cards 32 are held between web 62 of belt 58 and belt 56 and are thereby moved to the top of magazine 30 where belts 56 and 58 become disengaged and where stop 64 stops the movement of cards 32. Cards 32 are viewed through openings 60 as they come to rest at the top of magazine 30. Belts 56 and 58 may be moved at sufficient speed to produce an illusion of movement between successive cards of the sequence as each card comes to rest at the viewing area and is quickly replaced by the following card.

I claim:

1. A device for viewing in succession a series of indicia-bearing cards, said device comprising:

(a) a card-holding magazine for a stack of indicia-bearing cards, said magazine having a card exit portal and a card entry portal, (b) successive card withdrawal means at said exit portal, including an outer endless belt having a plurality of card shaped windows along its length, said outer belt being rotatable about said magazine and disposed to contact the outermost card at said exit portal, (c) card conveyor means between said exit portal and said entry portal, including said outer endless belt and an inner endless belt disposed to move in contact with said outer belt and to hold a card between said inner and outer belts, (d) rotatable roller suspension means for said belts, (e) turning means for one of said rollers; and (f) a viewing area through said window of said outer belt so disposed that each newly deposited card can be viewed through said belt when said window is over said entry portal.

2. The device of claim 1 having card deposit means, including a card guide positioned at said entry portal so as to stop the forward movement of said card and cause it to fall through said entry portal into said magazine.

References Cited by the Examiner

UNITED STATES PATENTS 120,309 10/71 Miller ------------------ 40—80

EUGENE R. CAPOZIO, *Primary Examiner.*

JEROME SCHNALL, *Examiner.*